United States Patent Office 3,546,200
Patented Dec. 8, 1970

3,546,200
LIGNIN PRECIPITATION FROM BLACK LIQUOR IN THE PRESENCE OF CHLORO, BROMO OR NITRO CONTAINING HYDROCARBONS
David M. Whalen, Washington Crossing, Pa., and Emery G. Tokoli, Rochester, N.Y., assignors to Union Camp Corporation, New York, N.Y., a corporation of Virginia
No Drawing. Filed June 18, 1968, Ser. No. 737,843
Int. Cl. C07g 1/00
U.S. Cl. 260—124
13 Claims

ABSTRACT OF THE DISCLOSURE

To eliminate the slimy, gelatinous and hard to filter form of the precipitated acid lignin from lignin-containing liquids, as encountered in paper manufacture, a small amount of a water immiscible solvent such as chloroform, 1,1,2-trichloroethane, methylene chloride, 1,2-dichloroethane, methylene bromide, 1- or 2-nitropropane or the like is mixed with the lignin-containing liquid to change the precipitate into a crystalline, easily filtered and quick settling precipitate.

---

This invention relates to a method of precipitating lignin, particularly acid lignin, from a solution and in the presence of a mixture in which three distinct phases occur; namely, a solid phase, an aqueous liquid phase and an organic liquid phase, wherein certain halogenated or nitrated hydrocarbons, effective in small amounts as the organic liquid phase, impart a unique surface-modifying effect to the lignin phase to make the lignin which is precipitated from the aqueous phase more easily filtered and crystalline in appearance.

The invention is particularly applicable to the acidification of kraft black liquor containing lignin dissolved in the aqueous alkaline medium which constitutes this black liquor, the acidification being generally effected by weak to moderate acidic materials, such as carbon dioxide or sulfur dioxide, or by stronger acidic materials, such as mineral acids, or by combinations of weak and strong acidic materials.

The use of the weaker carbon dioxide lowers the pH of the aqueous black liquor to cause the precipitation of a substantial amount of sodium lignate. The use of the moderate and strong acids, such as sulfur dioxide or mineral acids (sulfuric acid, hydrochloric acid, etc.) further lowers the pH of the aqueous black liquor and causes a further precipitation of the acid lignin in the form of a mixture of sodium lignate and hydrogen lignate, and ultimately at a low enough pH in the form of hydrogen lignate, these precipitates obtained by the aforesaid acidification being slimy, gelatinous, sponge-like materials which are very difficult to settle or filter and which retain a large quantity of imbibed, neutralized black liquor liquid.

One purpose of this invention is to provide a method of the precipitation of acid lignin from the black liquor which contains lignin in a form which is capable of being converted to the acid form and to avoid the slimy, spongy, impure precipitates of the prior art.

Another purpose of this invention is to provide a new method for precipitating and rapidly settling or filtering purified acid lignin in which the precipitated hydrogen lignate is free from contamination with sodium lignate impurity after acidification of the black liquor, the hydrogen lignate precipitate having its surface modified by the addition of small amounts of certain halogenated or nitrated hydrocarbon agents, to achieve a crystalline form which is quickly separated from the black liquor, easily washed, and results in a free flowing granular dry precipitate which can be easily dispensed and can be stored without caking.

The halogenated hydrocarbons and the nitrated hydrocarbons which are uniquely effective to change the surface of the precipitated hydrogen lignate from a slimy condition which is hard to separate and wash into a crystalline non-slimy condition which quickly separates from the black liquor and easily washes are based upon aliphatic hydrocarbons in which at least one hydrogen atom and the electronegative substituent such as chlorine, bromine, or $NO_2$ radical are attached to the same carbon atom, these aliphatic hydrocarbon compounds being straight chained, branched chained, or cyclic, and the straight chain, branched chain or cyclic compounds containing from 1 to 6 carbon atoms. Examples of preferred halogenated hydrocarbons are methylene chloride, 1,2-dichloroethane, chloroform, bromochloromethane, methylene bromide and 1,1,2-trichloroethane, and examples of preferred nitro compounds are nitroethane, 1-nitropropane, 2-nitropropane and nitrobenzene.

If the halogenated or nitrated hydrocarbon does not contain at least one hydrogen atom attached to the same carbon atom which bears the chlorine, bromine, or nitro radical, the resulting compound is completely ineffective, except for nitrobenzene, in improving the separation of hydrogen lignate and reducing the slime. For example, methyl chloroform and carbon tetrachloride are both ineffective.

To understand the mechanism of the effectiveness of the preferred halogenated hydrocarbon or nitro hydrocarbon, it is to be first understood that these compounds are very slightly soluble in water in the temperature range of 0–70° C. To illustrate all of these materials, the preferred material, chloroform, is typified by a negative coefficient for solubility between limits of one gram per 100 milliliters to less than 0.8 gram per 100 milliliters in pure water at 0–70° C. The solubility of the chloroform is similar to that of the nitrated compounds. This negative coefficient for chloroform means that at lower temperatures a higher amount of chloroform is dissolved. The precipitation in accordance with the invention proceeds equally well at 35–40° C. as at 10–20° C. Water is dissolved in the chloroform to an even lesser degree, e.g. less than 0.06 gram of water are dissolved in 100 grams of chloroform at 10° C. Less than 1.0 gram of the chloroform enters into 100 grams of the black liquor phase and there is a tendency for this small amount to be rejected because of the high salting-out effect of dissolved lignin and salts.

In short, the precipitation-enhancing agent of the present invention are effective when present in small quantities during the precipitation as a separate phase in the presence of acid precipitated hydrogen lignate (solid) or black liquor. The hydrogen lignate is not dissolved in the solvent enhancing agents or in the aqueous acidified black liquor phase which is, for all practical purposes, free from the immiscible halogenated hydrocarbon or its nitro equivalent.

An object of the invention is to provide a non-solvent, immiscible organic precipitation-enhancing agent which speeds up the filtration and settling of hydrogen lignate precipitated at a pH in the black liquor of less than 4, this pH being achieved by moderate to strong acids, and the precipitation-enhancing agent being present in relatively small amounts, often of the order of 0.3% by volume of the black liquor, for significant enhancement.

Another object of the invention is to provide high quality hydrogen lignate in free flowing, easily washed form through the addition of a surface-modifying immiscible halogenated or nitrated hydrocarbon to the black liquor.

While many agents have been studied by the inventors for the above, it was discovered that only a very few of these agents such as chloroform and methylene chloride, give particularly outstanding results in the degree and rate of precipitation. The resulting precipitate settles quickly and is in the form that can be easily filtered, readily washed and conveniently treated in commercial installations.

In practicing the method of the invention, a pressurized column with a filter at its bottom is utilized for the filtering step. A mixture of chloroform and an acid such as 2 N sulfuric acid is stirred for proper admixing in a closed mixing chamber to reduce the evaporation of $CHCl_3$. Into this mixture, black liquor is added in sufficient quantity to bring the pH of the aqueous filtrate into the 1.9 to 2.1 range. By carrying out the addition in the above order, there is no possibility of chemical reaction of the chloroform with the basic black liquor. The known reaction between phenols (lignin) and chloroform in the presence of base to yield ortho phenolic aldehydes is thus eliminated.

After sufficient stirring, the precipitation mixture is transferred into the pressurized column and allowed to stand. Thereafter, pressure is applied to the column to cause filtration and formation of the precipitation cake.

In commercial practice, the black liquor may be chosen from any phase of the liquor recovery cycle. It may be first stage liquor, or the skimmer discharge liquor, or the oxidized heavy liquor, or it may be any other type of black liquor as collected in large or small plants.

The chloroform, or other agent, may then be recovered from the filtered liquid by any conventional means such as by vacuum or steam distillation.

Studies of the effect of an agent, such as chloroform, in the above process disclosed that chloroform affected filtration in two primary ways. First, it decreased the amount of time necessary for filtration; and secondly, it reduced significantly the amount of the aqueous phase held by the filter cake. Since both of these effects appeared equally important, it seemed desirable to combine them into an arbitrary efficiency factor, one which would include both a filtration time measurement and a filter cake "dryness" measurement. For this purpose an arbitrary efficiency factor, $K_w$, was defined as follows:

$$K_w = \frac{\text{filtration time (sec.)}}{\left(\frac{H_2O \text{ collected (ml.)}}{H_2O \text{ calculated (ml.)}}\right) 100}$$

$$= \frac{\text{time}}{\text{percent } H_2O \text{ removed}}$$

Therefore, by definition, the shorter the filtration time and the drier the filter cake, the smaller will be $K_w$.

Table A below, for the first stage liquor, shows that $K_w$ decreases with the use of chloroform up to a point, such as 25 or 30 ml., and then rises.

TABLE A.—DETERMINATION OF A MINIMUM CHLOROFORM LEVEL FOR 150 g. OF FIRST STAGE LIQUOR (11.1% SOLIDS)

| Ml. $CHCl_3$ | $K_w$ |
|---|---|
| 0 | (1) |
| 5 | 5.13 |
| 10 | 2.67 |
| 25 | 1.48 |
| 50 | 1.76 |

[1] Could not be filtered.

Table B below summarizes the $K_w$ values obtained for skimmer discharge liquor at each chloroform level studied. In addition, a $K_w$ (no $CHCl_3$)/$K_w$($CHCl_3$) value has been calculated for each chloroform level and these values are included in Table B.

TABLE B.—DETERMINATION OF A MINIMUM CHLOROFORM LEVEL FOR 100 g. OF SKIMMER DISCHARGE LIQUOR (27.6% SOLIDS)

| Ml. $CHCl_3$ | $\cong k$ (average) | $K_w$ (no $CHCl_3$)/$K_w$ ($CHCl_3$) |
|---|---|---|
| 0.0 | 6.73±0.40 | 1.00 |
| 3.0 | 1.89±0.08 | 3.58±0.37 |
| 5.0 | 0.231±0.043 | 30.5±7.4 |
| 7.5 | 0.419±0.019 | 16.2±1.7 |
| 10.0 | 0.371±0.063 | 18.9±4.3 |
| 13.0 | 0.435±0.065 | 16.0±3.3 |
| 15.0 | 0.337±0.064 | 21.0±5.2 |
| 25.0 | 0.278±0.037 | 24.9±4.8 |
| 50.0 | 0.203±0.035 | 34.5±7.9 |

Two minimum $K_w$ values can be obtained for this amount of skimmer discharge liquor. The first minimum appears to occur at about 5 ml. of chloroform or 0.27 g. $CHCl_3$/g. skimmer discharge solids. This is followed by a slight increase at about 7.5 to 10 ml. and by a second minimum at 50 ml. or greater.

As with first stage liquor, all but about 8 to 12 ml. of the chloroform used can be recovered from the filtrate. Once again, however, any increase in the amount of chloroform used over this value still brings about a further somewhat surprising decrease in $K_w$.

Table C below summarizes the $K_w$ values and the $K_w$ (no $CHCl_3$)/$K_w$($CHCl_3$) values obtained from the study of diluted oxidized heavy liquor.

TABLE C.—DETERMINATION OF A MINIMUM CHLOROFORM LEVEL FOR 100 g. OF DILUTED OXIDIZED HEAVY LIQUOR (27.8% SOLIDS)

| Ml. $CHCl_3$ | $\cong k$ (average) | $K_w$ (no $CHCl_3$)/$K_w$ ($CHCl_3$) |
|---|---|---|
| 0.0 | 8.28±0.29 | 1.00 |
| 5.0 | 0.268±0.022 | 31.2±3.6 |
| 10.0 | 0.153±0.013 | 54.7±6.6 |
| 25.0 | 0.138±0.003 | 60.1±3.4 |
| 50.0 | 0.150±0.016 | 56.1±8.0 |

It can be seen that the minimum $K_w$ value appears to occur at about 25 ml. of chloroform or 1.35 g. $CHCl_3$/g. diluted oxidized heavy liquor solids. An increase in the amount of chloroform used over the 9 to 17 ml. retained by the filter cake brings about some further improvement in filterability, although it is not so marked for this oxidized liquor as for the first stage and skimmer discharge liquors.

From a study of the effect of $$K_w(\text{no } CHCl_3)/K_w(CHCl_3)$$

versus ml. $CHCl_3$ it can readily be seen that a doubling of filtration efficiency can be obtained at a chloroform level of 0.25 ml. of chloroform or 0.0135 g. $CHCl_3$/g. diluted oxidized heavy liquor solids. With other enhancing agents such as 1,2-dichloroethane even smaller amounts can be used.

The remarkable and unique effect of chloroform on the filtration rate of hydrogen lignate and on the determination of so-called minimum chloroform levels is seen from the above Tables A to C wherein maximum filterability improvement is dependent upon definite and minimum amounts of chloroform per gram of black liquor solids which lie in the range of 0.2–1.5 ml. of chloroform per gram of solids in the three streams studied. It was also seen that this small addition of chloroform, besides decreasing filtration time by a factor of about 25 to 35 also essentially doubles the amount of the aqueous phase which can be quickly removed by filtration in effective recoveries of 95 to 100% of the calculated amount of water present in the black liquor.

Other agents tested for improvement in lignin filterability are shown in Table D below.

TABLE D.—EFFECTS OF VARIOUS ORGANIC LIQUIDS ON THE FILTRATION RATE OF HYDROGEN LIGNATE

[Substrate: Diluted Oxidized Heavy Liquor]

| Solvent class and formula | Solvent | $K_\omega$ | $K_\omega$ (no solvent)/$K_\omega$ (solvent) |
|---|---|---|---|
| None | None | 6.86±0.34 | 1.00 |
| Halogenated aliphatic hydrocarbons: | | | |
| $CBrCl_3$ | Bromotrichloromethane | 6.62 | 1.04 |
| $CCl_3F$ | Freon 11 | 67.0 | 0.102 |
| $CCl_4$ | Carbon tetrachloride | 5.04 | 1.36 |
| $CHBr_3$ | Bromoform | 2.91 | 2.36 |
| $CHCl_3$ | Chloroform | 0.179±0.012 | 38.6±4.5 |
| $CH_2BrCl$ | Bromochloromethane | 0.215 | 31.9 |
| $CH_2Br_2$ | Methylene bromide | 0.766 | 8.96 |
| $CH_2Cl_2$ | Methylene chloride | 0.127±0.006 | 54.3±5.3 |
| $CCl_2F$—$CClF_2$ | Freon 113 | 109 | 0.0629 |
| $CCl_2$=$CCl_2$ | Tetrachloroethylene | 5.55 | 1.24 |
| $CHCl$=$CCl_2$ | Trichloroethylene | 4.02 | 1.71 |
| $CHCl_2$—$CH_2Cl$ | 1,1,2-trichloroethane | 1.49 | 4.60 |
| $CH_3CCl_3$ | Methyl chloroform | 16.3±4.3 | 0.459±0.142 |
| $CH_2Cl$—$CH_2Cl$ | 1,2-dichloroethane | 0.168 | 40.8 |
| Halogenated aromatic hydrocarbons: | | | |
| $C_6H_4Cl_2$ | o-Dichlorobenzene | 25.6 | 0.268 |
| $C_6H_5Cl$ | Chlorobenzene | 7.84 | 0.875 |
| Aliphatic hydrocarbons: | | | |
| $C_6H_{12}$ | Cyclohexane | 53.0 | 0.129 |
| $C_6H_{14}$ | n-Hexane | 32.6 | 0.210 |
| Aromatic hydrocarbons: | | | |
| $C_6H_6$ | Benzene | 13.0 | 0.528 |
| $C_6H_4(CH_3)_2$ | Xylene | 13.4 | 0.512 |
| Aliphatic and aromatic nitro compounds: | | | |
| $CH_3CH_2CH_2NO_2$ | 1-nitropropane | 0.294 | 23.3 |
| $CH_3CH(NO_2)CH_3$ | 2-nitropropane | 0.442 | 15.5 |
| $C_6H_5NO_2$ | Nitrobenzene | 0.721 | 9.51 |
| Alcohols: | | | |
| iso-$C_8H_{17}OH$ | iso-Octyl alcohol | 10.3 | 0.666 |
| Ethers: | | | |
| $(n-C_4H_9)_2O$ | Di-n-butyl ether | 21.6 | 0.318 |

Cyclohexanol, diethyl ether, acetophenone and methyl iso-butyl ketone were tested and found unsuccessful.

The following solvents are also satisfactory as enhancing agents: $CH_3CHCl_2$, $CHCl_2CHCl_2$, $CHCl$=$CHCl$, $CH_3OCH_2Cl$, $CH_2ClCHClCH_2Cl$, $CH_3CHClCH_2Cl$, $$(CH_3)_2CHCl$$

$CH_3CH_2CH_2Cl$, $CH_2$=$CHCH_2Cl$, $CH_3CH_2CH(Cl)NO_2$, $CH_3(CH_2)_2CH_2Cl$, $CH_3CH_2CHClCH_3$, $$CH_2=C(CH_3CH_2Cl$$

$CH_2Cl(CH_2)_2CH_2Cl$, $CH_2ClCH$=$CHCH_2Cl$, $$(CH_2ClCH_2)_2O$$

$(CH_2ClCH(CH_3))_2O$, $CH_3CH_2CH(CH_2Cl)(CH_2)_3CH_3$, $CH_3CH_2NO_2$.

All of the crystallization modifying compounds of the invention showing any reasonable degree of effectiveness in terms of $K_w$ (no solvent)/$K_w$ (solvent) have a structure in which both hydrogen atom or atoms and the electronegative substituent such as Br, Cl and $NO_2$ are attached to the same carbon atom in a hydrocarbon preferably of from 1–6 carbon atoms aliphatic or cyclic or if aromatic, up to 8 carbon atoms.

$$\begin{array}{c} H \\ | \\ -C-X \\ | \end{array}$$

where X=Cl, Br, $NO_2$

The only exception is $C_6H_5NO_2$.

THE EFFECT OF pH ON THE METHYLENE CHLORIDE-AIDED LIGNATE FILTRATION (a) Apparatus and procedure The apparatus and general procedures used for this part of the study were the same as those described above. The acid used throughout the study was 2 N $H_2SO_4$. In order to bring about an increase in pH, smaller amounts of acid were used in each run. The volume of the aqueous phase was kept constant, however, by addition of the appropriate amounts of water so that all tests were under the same conditions.

(b) Black liquor studied

Diluted oxidized heavy liquor when chosen as the substrate is the full equivalent of skimmer discharge liquor.

Another chlorinated hydrocarbon agent giving outstanding results is methylene chloride. In this connection, it was discovered that the effectiveness of the agent varies with the pH and is shown in the following table, Table E, with respect to methylene chloride.

TABLE E.—EFFECT OF pH ON METHYLENE CHLORIDE-AIDED LIGNATE FILTRATION 100 g. diluted oxidized heavy liquor (28.0% solids)
50.0 ml. $CH_2Cl_2$

| pH | $K_w$ |
|---|---|
| 1.90 | 0.137 |
| 2.77 | 0.393 |
| 3.33 | 0.509 |
| 3.61 | 2.06 |
| 3.84 | 4.96 |
| 4.11 | 25.9 |

In general, it can be said that methylene chloride exerts its strongest effect at pH's below the range of 3–4, as for example below 3.3.

We claim:

1. In the process of precipitating lignin from alkaline black liquor, the steps comprising acidifying the mixture with an acidic agent to a pH of less than 4.1 and treating the mixture before filtering with a precipitation-enhancing agent comprising a water immiscible hydrocarbon which is heavier than water, contains from 1 to 8 carbon atoms and is substituted on at least one carbon atom with chlorine, bromine or nitro groups, there being present at least 0.009 milliliter of said agent per gram of solids in said black liquor.

2. A process as claimed in claim 1 wherein the precipitation-enhancing agent is nitrobenzene.

3. A process as claimed in claim 1 wherein the precipitation-enhancing agent is 1-nitropropane.

4. A process as claimed in claim 1 wherein the precipitation-enhancing agent is 2-nitropropane.

5. A process as claimed in claim 1 wherein the precipitation-enhancing agent is bromochloromethane.

6. A process as claimed in claim 1 wherein the precipitation-enhancing agent is methylene bromide.

7. A process as claimed in claim 1 wherein the precipitation-enhancing agent is 1,1,2-trichloroethane.

8. A process as claimed in claim 1 wherein the precipitation-enhancing agent is 1,2-dichloroethane.

9. In the process of precipitating lignin from alkaline black liquor, the steps comprising acidifying the mixture with an acidic agent to a pH of less than 4.1 and treating the mixture before filtering with a precipitation-enhancing agent selected from the group consisting of chloroform, 1,2-dichloroethane and methylene chloride to cause the formation of a gritty precipitate which filters or settles quickly and easily.

10. A process as claimed in claim 9 wherein the precipitation-enhancing agent is chloroform.

11. A process as claimed in claim 9 wherein the precipitation-enhancing agent is methylene chloride.

12. A process as claimed in claim 9 wherein the black liquor is acidified to a pH in the range of from 3.3 to 3.5.

13. A process as claimed in claim 9 wherein an acidified lignin liquor is mixed with black liquor in order to bring the pH to a value of less than 4.1.

References Cited
UNITED STATES PATENTS 3,048,576   8/1962   Ball et al. _____ 260—124

CHARLES B. PARKER, Primary Examiner

D. R. PHILLIPS, Assistant Examiner